(12) United States Patent
Tsou

(10) Patent No.: US 10,683,051 B2
(45) Date of Patent: Jun. 16, 2020

(54) HEAT DISSIPATION DEVICE FOR AN ENGINE OF A MOTORCYCLE

(71) Applicant: Chi-Chang Tsou, Taoyuan (TW)

(72) Inventor: Chi-Chang Tsou, Taoyuan (TW)

( * ) Notice: Subject to any disclaimer, the term of this patent is extended or adjusted under 35 U.S.C. 154(b) by 187 days.

(21) Appl. No.: 16/034,885

(22) Filed: Jul. 13, 2018

(65) Prior Publication Data

US 2019/0135364 A1 May 9, 2019

(30) Foreign Application Priority Data

Nov. 7, 2017 (TW) .............................. 106216513 U

(51) Int. Cl.
  *B62J 23/00* (2006.01)
  *F01P 1/06* (2006.01)
  *F01P 5/06* (2006.01)
  *B62J 17/06* (2006.01)

(52) U.S. Cl.
  CPC ............... *B62J 23/00* (2013.01); *B62J 17/06* (2013.01); *F01P 1/06* (2013.01); *F01P 5/06* (2013.01); *F01P 2050/16* (2013.01)

(58) Field of Classification Search
  CPC .... B62J 23/00; B62J 17/06; F01P 1/06; F01P 5/06
  See application file for complete search history.

(56) References Cited

U.S. PATENT DOCUMENTS

| | | | | |
|---|---|---|---|---|
| 3,756,623 A | * | 9/1973 | Whittler | B62J 23/00 280/304.3 |
| 4,334,589 A | * | 6/1982 | Asakura | B62K 11/04 180/219 |
| 6,626,448 B2 | * | 9/2003 | Miles | B62J 23/00 280/291 |
| 2007/0245985 A1 | * | 10/2007 | Frijas | F01P 11/10 123/41.31 |
| 2010/0308557 A1 | * | 12/2010 | Pruit | B62J 23/00 280/304.3 |

* cited by examiner

*Primary Examiner* — Kevin A Lathers
(74) *Attorney, Agent, or Firm* — Muncy, Geissler, Olds & Lowe, P.C.

(57) ABSTRACT

The present invention provides a heat dissipation device for an engine of a motorcycle. The device includes a heat dissipation mask. The heat dissipation mask is disposed at a side of the engine such that it is not in substantial contact with the engine. The heat dissipation mask includes an open side that substantially encloses at least one side of the engine. An open is also provided at the bottom of the heat dissipation mask. The heat dissipation mask is configured to substantially correspond to a location of the leg of the rider in a riding position. Some parts of the heat dissipation mask also correspond to the engine so as to prevent the heat from spreading toward the rider. In such a way, a heat dissipation device with a reduced structure is provided, which is easy to install and is capable of dissipating heat around the engine.

18 Claims, 7 Drawing Sheets

HEAT DISSIPATION DEVICE FOR AN ENGINE OF A MOTORCYCLE

CROSS-REFERENCE TO RELATED APPLICATION

This application claims the priority of Taiwanese patent application No. 106216513, filed on Nov. 7, 2017, which is incorporated herewith by reference.

BACKGROUND OF THE INVENTION

1. Field of the Invention

The present invention relates to a heat dissipation device; more particularly, relates to a heat dissipation device for an engine of a motorcycle.

2. The Prior Arts

Ever since unlimited road access for large motorcycles has been granted, the motorcycle market in Taiwan started to thrive and became prosperous. However, due to the huge size of the body of a large motorcycle, high horsepower and high fuel consumption are required, thus causing the engine of such a motorcycle to generate a greater amount of heat than a scooter. In particular, since the engine of a large motorcycle are usually exposed on the outside without any shielding, after the engine is started and as the riding distance started to build up or as the riding speed becomes higher, the temperature of the engine also rises due to the heat accumulation effect. In addition, the temperature of the engine may also rise due to exposure to the sun. When riding, a rider straddles on the motorcycle with his or her inner thigh within the vicinity of the engine. In this position, inner thighs of the rider are usually extremely close to the engine, thus are likely to feel the temperature of the engine. The rider may move his or her thigh outward unconsciously when the temperature gets too high, thus resulting in a loss of focus and also compromising the safety of the rider. Further, the rider is likely to touch the engine accidentally with his or her thighs when getting on or off the motorcycle, which may result in burn injuries due to the high temperature of the engine. Hence, it is an urgent task for the industry to develop a practical and safe accessory for motorcycles that is capable of protecting the rider from the high temperature of the engine and also capable of dissipating heat from certain areas around the engine.

SUMMARY OF THE INVENTION

A primary objective of the present invention is to provide a heat dissipation device that is capable of effectively exhausting heat from an engine of a motorcycle. More particularly, the heat dissipation device may effectively dissipate heat from certain areas around the engine, especially from areas that are close to the rider. The heat dissipation device of the present invention includes a heat dissipation mask. The heat dissipation mask is disposed at a side of the engine such that the heat dissipation mask is not in substantial contact therewith. The heat dissipation mask includes an open side, which is provided at a side that is closer to the rider and also provided at a bottom side thereof. The heat dissipation mask is configured to substantially correspond to a leg position of the rider when he or she is riding, and another portion of the heat dissipation mask is configured to correspond to the engine.

Another objective of the present invention is to provide a heat dissipation mask that has a reduced structure and is also easy to install. The device of the present invention is designed in such a way that the structure thereof corresponds to an existing structure of a motorcycle. In particular, the device of the present invention includes an upper mounting member and a lower mounting member. The upper mounting member has a substantially L-shape. A surface of the upper mounting member is mounted on an inner plate, and another surface of the upper mounting member is mounted on a frame of the motorcycle. An end of the lower mounting member is mounted on the mounting plate, and another end of the lower mounting member is provided with a through hole for a belt member to pass through.

When a belt member is adopted, an end of the belt member is configured to pass through the through hole and to further bypass pipelines of the motorcycle, in turn, the belt member is configured to form a closed loop. Alternatively, one end of the belt member is configured to pass through the through hole and further pass around the pipelines of the motorcycle for one or more loops; subsequently, the belt member is configured to form a closed loop. In such a way, the lower mounting member is mounted to the pipelines or exhaust pipes of the motorcycle with the belt member.

In one embodiment of the present invention, the device of the present invention further includes a clamp ring. The clamp ring at least comprises a ring body and an attachment member, and a gap portion is provided between two ends of the ring body. The ring body is sleeved on the pipeline of the motorcycle. The attachment member is configured to pass through the through hole and to be attached to the gap portion so as to seal the ring body. In such a way, the clamp ring is clamped onto the pipeline of the motorcycle.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
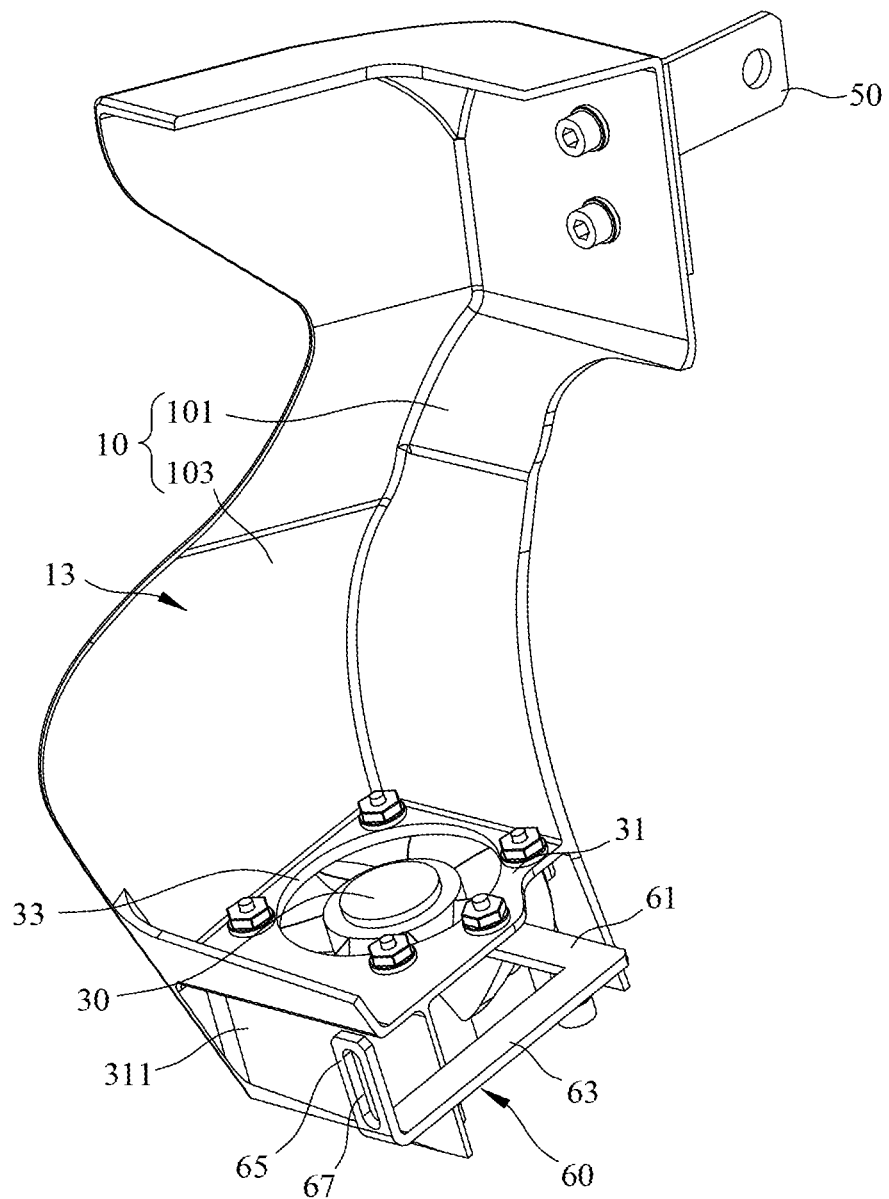
FIG. 1 is a perspective view illustrating a heat dissipation device for an engine of a motorcycle.
Figure 2:
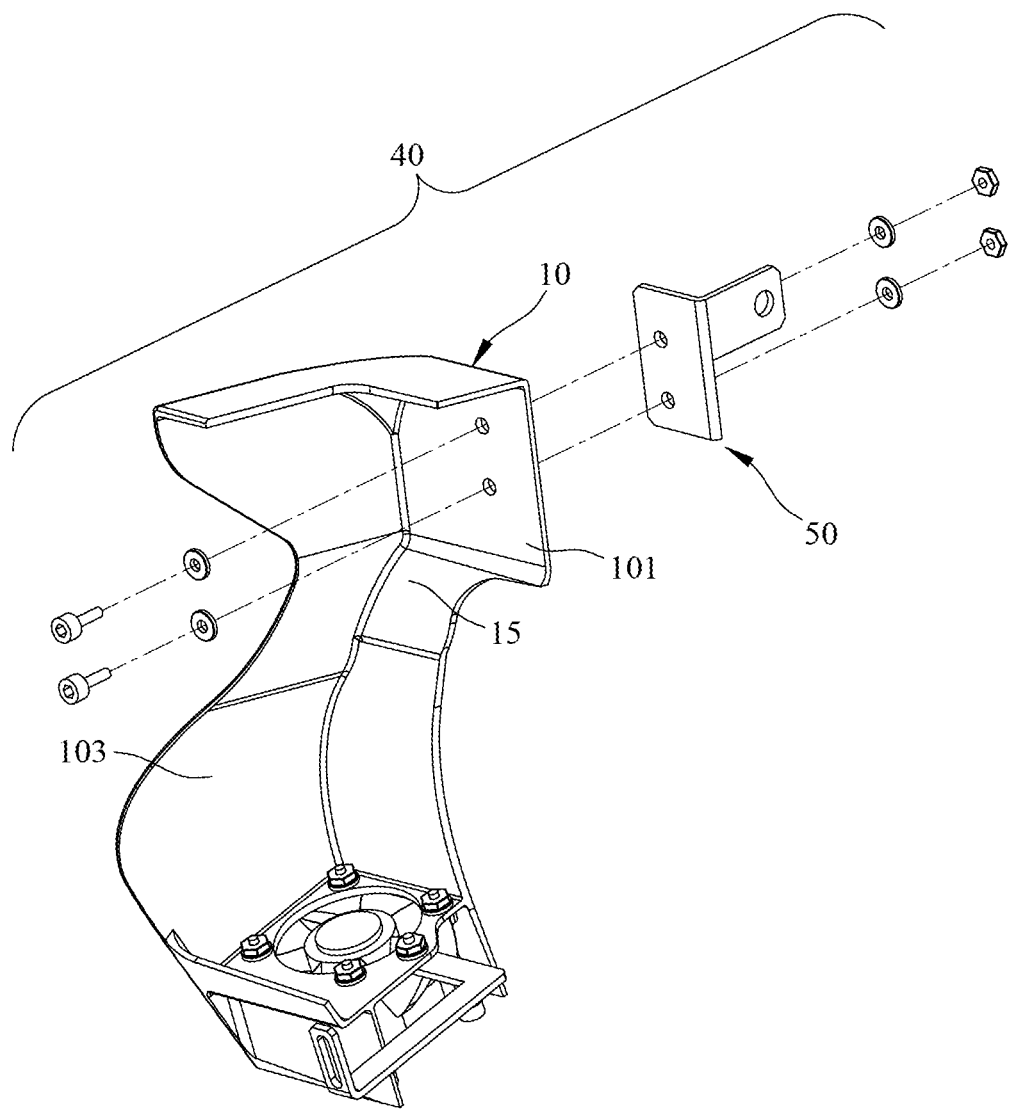
FIG. 2 is an exploded view illustrating the heat dissipation device for an engine of a motorcycle.
Figure 3:
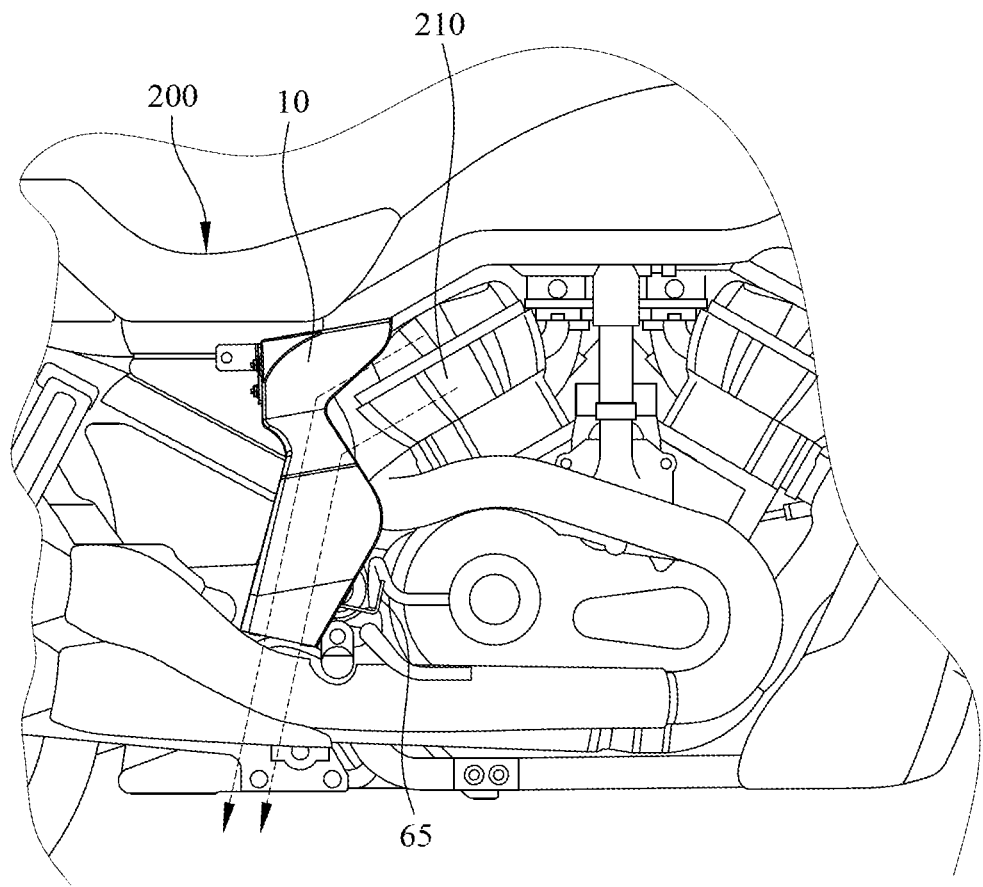
FIG. 3 is a schematic view illustrating an installed heat dissipation device.

See FIG. 1, FIG. 1 is an assembly view illustrating a heat dissipation device for an engine of a motorcycle of the present invention. See FIG. 2, FIG. 2 is an exploded view illustrating the heat dissipation device for an engine of a motorcycle of the present invention. FIG. 3 is a schematic view illustrating an installed heat dissipation device. As shown in FIG. 1, the heat dissipation device 100 for an engine of a motorcycle includes a heat dissipation mask 10. The heat dissipation mask 10 is installed at a side of a motorcycle 200 such that it corresponds to a leg portion of a rider when the rider is in riding position, or corresponds to a location where the rider put his or her leg when riding the motorcycle. Preferably, the heat dissipation mask 10 is installed at both sides of the motorcycle. The heat dissipation mask 10 is disposed around the engine 210 such that it is not in substantial contact with the engine, i.e., the heat dissipation mask 10 is spaced apart from the engine with a gap. Preferably, the heat dissipation mask 10 of the present invention is provided with a half-open structure.

In one embodiment of the present invention, a space 13, which is a half-open space, is provided in the body of the heat dissipation mask 10. When the heat dissipation mask 10 is installed outside a side of the engine 210, an at least relatively confined space is created by the space 13 and the engine 210. Once heat is generated by the engine 210, the heat would linger and stay in the at least relatively confined space so as to prevent the heat from transferring to the leg of the rider. Herein, the at least relatively confined space is referring to a space up to an outline of the heat dissipation mask that is generally along the engine 210. Hence, the outline of the heat dissipation mask 10 generally corresponds to the outline of the engine. The heat dissipation mask 10 is disposed as close to the engine as possible but is not in substantial contact therewith. In other words, an open side of the heat dissipation mask 10 substantially encloses or substantially corresponds to at least one side of the engine 210, or the heat dissipation mask 10 may be configure to partially cover the engine 210. As a result, heat from certain parts of the engine 210 may be blocked by the heat dissipation mask and is prevented from spreading to the side of the motorcycle.

As shown in FIG. 1, a part of the heat dissipation mask 10 that is near the engine is an open portion or an open side, and an air outlet 33 is provided on the heat dissipation mask 10. In one embodiment of the present invention, the heat dissipation mask 10 with a non-closed structure may at least consist of an inner plate 101 and an outer plate 103. The horizontal cross sections of the inner plate 101 and the outer plate 103 each has an L-shape. The inner plate 101 is disposed inside the space of the motorcycle 200 in an upright position with a surface of the inner plate 101 facing the engine 210. The outer plate 103 is located between the motorcycle 200 and the leg of the rider. The outer plate 103 is located at a side of the motorcycle 200 in an upright position, and a surface of the outer plate 103 is parallel to a body length direction of the motorcycle 200 (i.e., the outer plate is configured to extend along the body length direction). In addition, a side of the outer plate 103 that is closer to a front of the motorcycle has a contour that corresponds to a contour of the engine.

In particular, proper gaps may be provided between the engine 210 and other components of the motorcycle 200. For example, a gap is provided at both a front side (i.e., a side that is closer to the front of the motorcycle) and a back side of the engine 210. The inner plate 101 is disposed inside the space at the back side of the engine 210, and the outer plate 103 is disposed at a left side or a right side of the motorcycle 200. In such a way, the inner plate 101 is substantially parallel to the handle or is disposed along a width direction of the inner plate 101. Herein, the heat dissipation mask 10 should be provided with a certain and proper longitudinal length. Preferably, the longitudinal height of the heat dissipation mask 10 is greater than the longitudinal height of the engine 210.

By configuring the heat dissipation mask 10, the at least relatively confined space that may be used to contain the heat is created by the inner plate 101, the outer plate 103 and the engine 210. As a result, the heat generated by the part of the engine 210 that is closer to the rider may be contained inside the heat dissipation mask 10 without spreading arbitrarily. Especially, the heat would be prevented from spreading to the leg portion of the rider.

In addition to the heat insulation method described above, in a preferred embodiment of the present invention, the present invention also provides a method for exhausting heat in a certain direction to enhance heat dissipation efficiency. In the preferred embodiment, the device further includes a cooling fan 30. The cooling fan 30 is disposed inside the heat dissipation mask 10. When the cooling fan 30 is turned on, the heat contained in the at least relatively confined space is exhausted to the outside of the heat dissipation mask 10 by the cooling fan 30. Preferably, the cooling fan is disposed at a bottom side of the case 10. That is, the cooling fan is located at a bottom side or below the at least relatively confined space. In such a way, the heat may be exhausted toward the bottom side of the motorcycle 200, so the hot air is prevented from blowing toward the rider. Instead, the hot air is exhausted toward the road surface and is blown away immediately by the wind; consequently, the heat may be dissipated efficiently without passing through the legs of the rider, as shown by the arrows in FIG. 3. As a result, the temperature around the engine 210 may drop, and the rider may be prevented from being affected by the heat or getting burned from touching the engine.

In one embodiment of the present invention, the device of the present invention further includes a mounting plate 31. The mounting plate 31 is disposed inside the heat dissipation mask 10 and is located at a lower half thereof. The air outlet 33 penetrates through the mounting plate 31 such that the mounting plate 31 has a structure approximating a wind tunnel. The cooling fan 30 is disposed below the mounting plate 31 and is attached to the mounting plate 31. That is, the cooling fan 30 is disposed in the wind tunnel. When the cooling fan 30 is turned on, the heat in the at least relatively confined space would be exhausted by the cooling fan 30 and is exhausted toward the bottom side of the motorcycle 200.

The heat dissipation mask 10 may be mounted to the motorcycle in various ways. In a preferred embodiment of the present invention, the device of the present invention further includes an upper mounting member 50 having an L-shape or any other suitable shapes. The upper mounting member 50 includes a transvers section and a longitudinal section. The transverse section of the upper mounting member 50 is configured to correspond to the inner plate 101 so as to be mounted on the upper half of the inner plate 101. For example, the upper mounting member 50 may be mounted in the proximity of the top edge of the inner plate 101. The longitudinal section of the upper mounting member 50 is configured to correspond to the outer side of the frame of the motorcycle 200 so as to be mounted on the frame of the motor cycle 200. The longitudinal section may be mounted to the frame via screw sets 40 or the like.

In another preferred embodiment of the present invention, the device of the present invention further includes a lower mounting member 60. An end of the lower mounting member 60 is fixed to the mounting plate 31. A through hole 67 is provided at another end of the lower mounting member 60 for a belt member (not shown) to pass through.

When a belt member is adopted, an end of the belt member is configured to pass through the through hole and to further bypass pipelines of the motorcycle, in turn, the belt member is configured to form a closed loop. Alternatively, one end of the belt member is configured to pass through the through hole and further pass around the pipelines of the motorcycle for one or more loops; subsequently, the belt member is configured to form a closed loop. In such a way, the lower mounting member is mounted to the pipelines or exhaust pipes of the motorcycle with the belt member.

Herein, the belt member may be any kind of strip members that may be configured into a loop structure, such as a cable tie, a rope, a chain or a strip-shaped object. For example, a cable tie may be form into a loop structure by ways of buckling, tying, hooking and etc. Preferably, the lower mounting member 60 may include a first extension section 61 and a second extension section 63. The first extension section 61 is configured to extend from an end that is mounted on the mounting plate 60 to a direction of the motorcycle 200 for a proper distance (relatively speaking, the first extension section 61 is configured to extend along the inner plate). Then, the second extension section 63 continues to extend from the first extension section 61 in a length direction of the motorcycle 200 to an outside of the outer plate 103, so an outer end of the second extension section 63 is not shielded by the outer plate 103. A bent portion 65 is formed at the outer end of the second extension section 63, and the through hole 67 is provided in the bent portion 65. With such a configuration, the part of the lower mounting member with the through hole 67 may be exposed outside of the heating mask 10 at a location near the exposed pipelines or exhaust pipes of the motorcycle 200. Hence, by tying or tightening the lower mounting member with the exposed pipelines or exhaust pipes of the motorcycle 200 with a rope that passes through the lower mounting member, the heat dissipation mask may be mounted to the pipelines or exhaust pipes of the motorcycle 200 in a quick and convenient manner without any additional mechanism.

Figure 4:
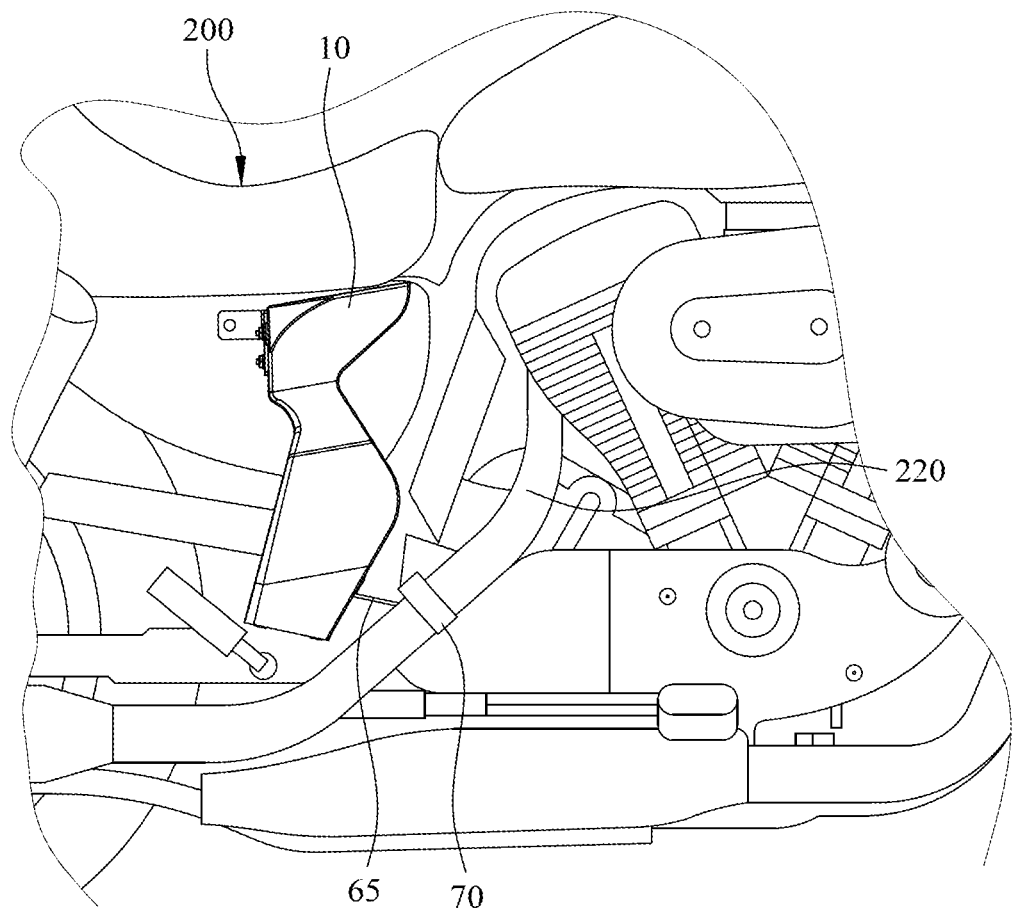
FIG. 4 is a schematic view illustrating the heat dissipation device that is mounted with a clamp ring.

As shown in FIG. 4, the device of the present invention further includes a clamp ring 70. The clamp ring 70 may be any clamp rings with a gap portion such as a C-shaped ring (not shown) and a screw 71. The C-shaped ring may be sleeved around the outer peripheral of the exhaust pipe of the motorcycle. The screw 71 is configured to pass through the through hole 67 and is tightened to shorten the distance between the two ends of the C-shaped ring, or is tightened until the two ends of the C-shaped ring are abutted against each other. In other words, the screw 71 may be screwed through the two ends of the C-shaped ring so the clamp ring 71 is clamped onto the exhaust pipe of the motorcycle. Preferably, the material of the clamp ring is metal. Herein, a portion of the exhaust pipe is slanted or is substantially perpendicular, and the bent portion may also be slanted or perpendicular. In such a way, the screw 71 may pass through more easily.

Alternatively, the bent portion 65 of the lower mounting member 60 may be disposed in the gap portion of the C-shaped ring. When the screw 71 is screwed in, the bent portion 65 may be clamped between the two ends of the C-shaped ring so as to provide a good fixation.

Notably, the C-shaped ring described above is merely an embodiment to facilitate discussion but to limit the scope of the present invention. In other words, all clamp rings with a gap portion are considered within the scope of the present invention.

As shown in FIG. 1, the heat dissipation mask at least consists of an inner plate 101, an outer plate 103 and a mounting plate 31. The horizon cross sections of the inner plate 101 and the outer plate 103 each has an L-shaped cross section. The inner plate 101 is located behind the engine 101 and a surface of the inner plate 101 is configured to face the engine 210. The outer plate 103 is perpendicular to the inner plate 101. Further, the outer plate 103 extends from a side of the inner plate in a body length direction of the motorcycle toward the engine, so a surface of the outer plate corresponds to the leg portion of the rider. Moreover, an edge of the outer plate is extremely close to the outer surface of the engine and is only spaced apart from the engine with a small gap.

Preferably, the inner plate 101, the outer plate 103 and the mounting plate 31 is integratedly formed. Two adjacent sides of the mounting plate 31 are respectively connected to the inner plate 101 and the outer plate 103, and the mounting plate 31 is perpendicularly intersected with the inner plate 101 and the outer plate 103. Herein, a reinforcement plate 311 is configured to extend downward from a side of the mounting plate 31 and is configured to correspond to the inner plate 101. The cooling fan 30 is located between the reinforcement plate 311 and the inner plate 101. In such a way, a certain structural strength is provided to the bottom side of the heat dissipation mask for supporting the cooling fan, so the cooling fan may operate steadily. Herein, the lower mounting member 60 may be disposed on a side of the mounting plate 31 that is opposite from the outer plate 103.

Figure 5:
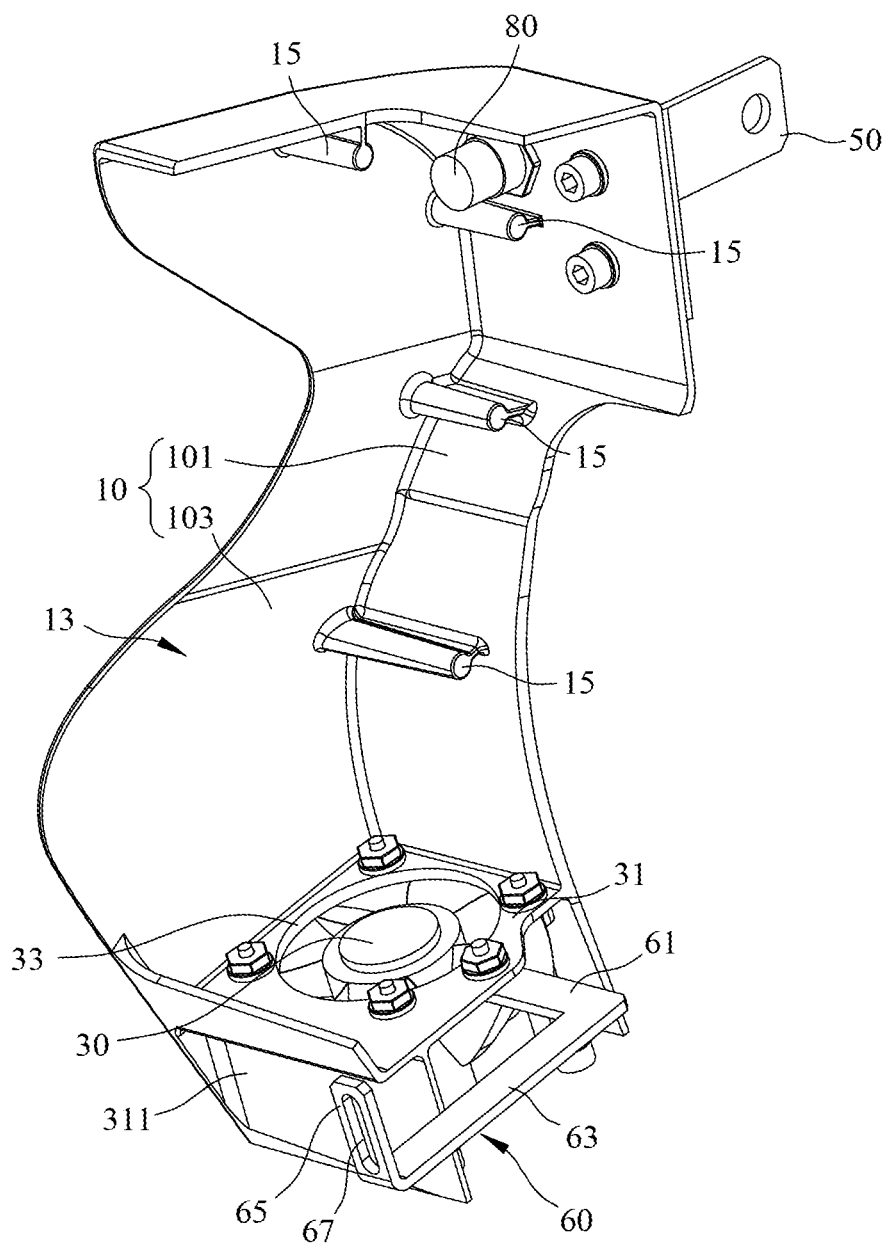
FIG. 5 is a schematic view illustrating a power switch of the heat dissipation device.

As shown in FIG. 5, the device of the present invention further includes a power switch 80. The power switch 80 is disposed at an upper half of the inner plate 101 and is electrically connected to a battery of the motorcycle 200. However, the configuration of the power switch 80 is no limited thereto. The power switch may also be electrically connected to an external power supply. Hence, the power supply unit of the cooling fan may be the battery of the motorcycle or an external power supply.

As shown in FIG. 5, the device of the present invention may include a plurality of ribs 15. The ribs are disposed at a junction of the inner plate 101 and an outer plate 103 so as to strengthen the overall structural strength of the heat dissipation mask.

Figure 6A:
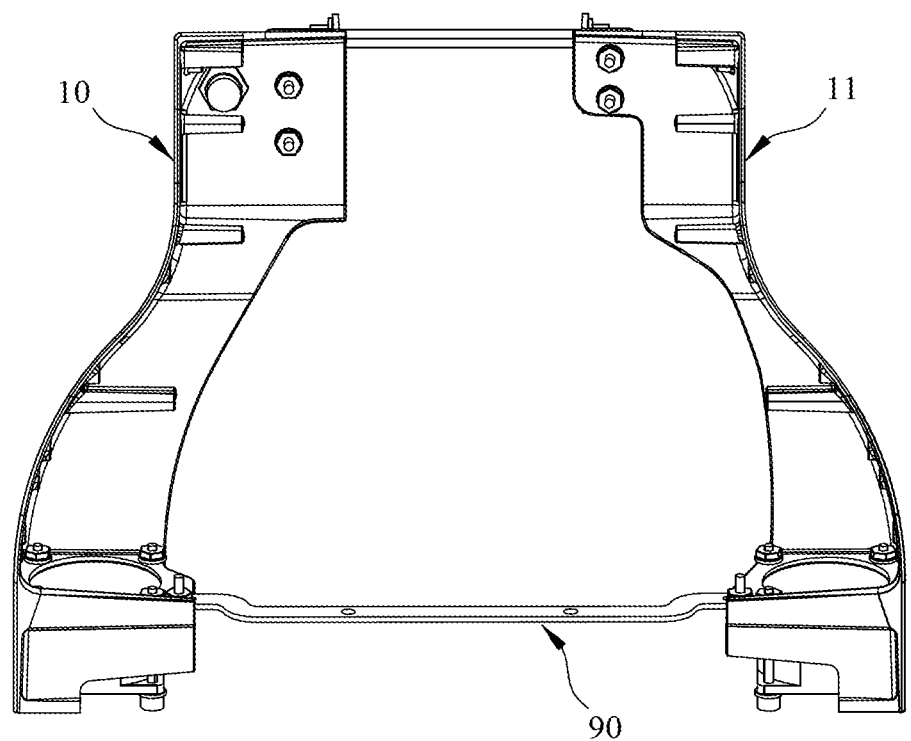
FIG. 6*a* is a front view illustrating the heat dissipation device according to a preferred embodiment of the present invention.
Figure 6B:
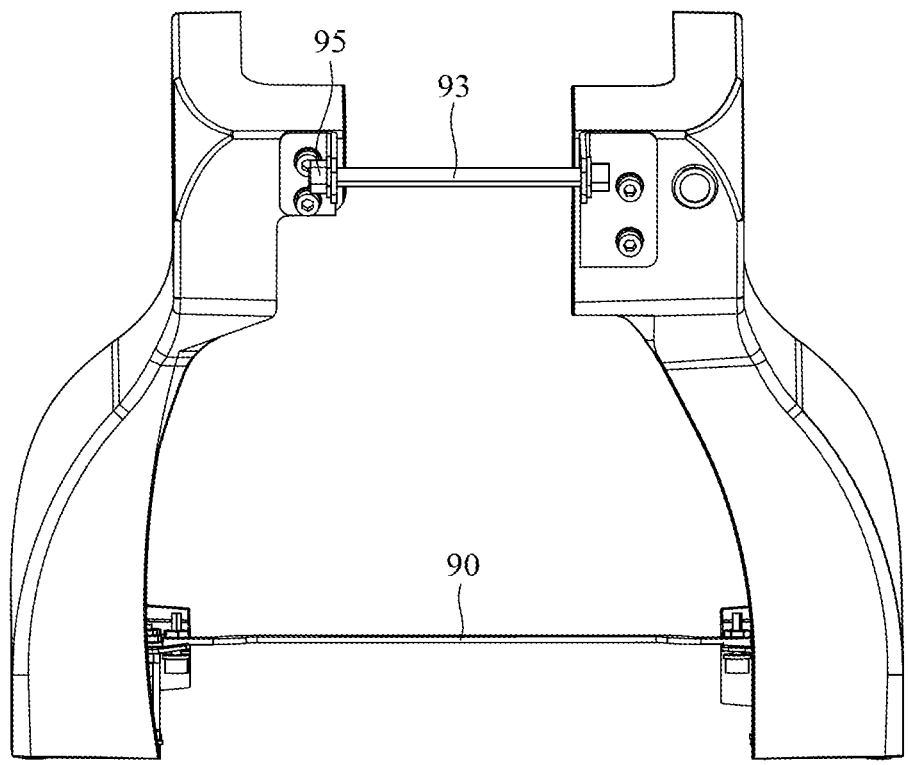
FIG. 6*b* is a rear view illustrating the heat dissipation device according to the preferred embodiment of the present invention.

Refer to FIG. 6a, FIG. 6a is a front view illustrating the heat dissipation device according to a preferred embodiment of the present invention. Refer to FIG. 6b, FIG. 6b is a rear view illustrating the heat dissipation device according to the preferred embodiment of the present invention. As shown in FIG. 6a, the device of the present invention further includes another heat dissipation mask that has an exact same structure with the heat dissipation mask 10 described above. That is, a heat dissipation mask 10 is disposed at both sides of the motorcycle. The two heat dissipation masks 10 are installed in an exact same way as described above and are symmetrical with each other. In other words, the outer surfaces of the two heat dissipation masks are configured to correspond with each other, and the inner surfaces of the two heat dissipation masks are configured to form a flat surface collaboratively. In addition, when two heat dissipation masks 10 are implemented, a link bar 90 is configured to connect the two heat dissipation masks 10. Specifically, two ends of the link bar 90 are respectively mounted on the mounting plates of the two heat dissipation masks 10.

As shown in FIG. 6b, the device of the present invention further includes a long screw 93 and a nut 95. Herein, the long screw 93 is configured to pass through the upper mounting member 50 of the two heat dissipation masks 10 and the frame. Subsequently, the nut 95 is screwed onto the long screw 93 to force the two upper mounting members to abut against the frame. In such a way, the two heat dissipation masks are steadily mounted onto the frame.

With a configuration of the link bar and the long screw set, the two heat dissipation masks may be mounted to the body of the motorcycle in a way that they do not experience any oscillation. As a result, lower mounting members and other related structures may be omitted. Herein, the link bar 90 is disposed horizontally between the heat dissipation mask and another heat dissipation mask.

The device of the present invention is advantageous in that the structure thereof is simplified and is also easy to install. In particular, the mounting structures and heat dissipation channels of the device are designed based on an existing structure of the motorcycle, so the heat dissipation mask of the present invention may be installed swiftly without having to alter the structure of the motorcycle. More particularly, the heat generated by the engine is effectively collected by heat dissipation channels of the heat dissipation mask, so the heat is prevented from spreading toward the user. Further, when a cooling fan is provided in the heat dissipation mask, the heat generated by the engine may be dissipated more efficiently. Not only the temperature of the engine may be prevented from accumulating, but the cooling efficiency of the engine may also be increased, especially in areas of the engine that are close to the rider.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A heat dissipation device for an engine of a motorcycle, comprising:
a heat dissipation mask disposed outside of the engine of the motorcycle such that the heat dissipation mask is not in substantial contact therewith, wherein a side of the heat dissipation mask that is closer to the engine is an open side, the heat dissipation mask at least consists of an inner plate and an outer plate, and horizontal cross sections of both the inner plate and the outer plate each has an L-shape; wherein the outer plate is disposed at a side of the motorcycle in an upright position, a surface of the outer plate is parallel and corresponds to a body length direction of the motorcycle, a side of the outer plate that is closer to a front of the motorcycle has a contour that corresponds to a contour of the engine, and the side of the outer plate that is closer to the front of the motorcycle is spaced apart from the engine with only a gap.

2. The heat dissipation device according to claim 1, wherein the heat dissipation mask has a half-open structure.

3. The heat dissipation device according to claim 1, wherein a longitudinal height of the heat dissipation mask is greater than a longitudinal height of the engine.

4. The heat dissipation device according to claim 3, further comprising a cooling fan disposed inside the heat dissipation mask.

5. The heat dissipation device according to claim 4, wherein the cooling fan is disposed at a bottom of the heat dissipation mask.

6. The heat dissipation device according to claim 4, further comprising a mounting plate disposed inside the heat dissipation mask and located at an lower half thereof, wherein the mounting plate includes an air outlet, the cooling fan is displaced below the mounting plate and is attached thereto.

7. The heat dissipation device according to claim 6, further comprising another heat dissipation mask and a first link bar, wherein the another heat dissipation mask has an exact same structure as the heat dissipation mask, the heat dissipation mask and the another heat dissipation mask are disposed at opposite sides of the motorcycle, and two ends of the link bar are respectively mounted on the mounting plates of the heat dissipation mask and the another heat dissipation mask.

8. The heat dissipation device according to claim 7, wherein the another heat dissipation mask and the heat dissipation mask are configured to be symmetrical with each other, outer surfaces of the another heat dissipation mask and the heat dissipation mask are configured to correspond to each other, and inner surfaces of the another heat dissipation mask and the heat dissipation mask are configured to form a flat surface collaboratively; wherein two ends of the link bar are respectively mounted on the mounting plates of the heat dissipation mask and the another heat dissipation mask, and the link bar is disposed between the heat dissipation mask and the another heat dissipation mask in a substantially horizontal manner.

9. The heat dissipation device according to claim 7, further comprising a long screw and a nut, wherein the long screw is configured to pass through the upper mounting members of two heat dissipation masks and the frame, and the nut is screwed onto the long screw to force the upper mounting members to abut against the frame.

10. The heat dissipation device according to claim 4, wherein the heat dissipation mask further comprises a mounting plate, the inner plate is located behind the engine and a surface of the inner plate is configured to face the engine; wherein the outer plate extends from a side of the inner plate in the body length direction of the motorcycle toward the engine, such that a surface of the outer plate correspond to a leg portion of a rider; wherein corresponding two sides of the mounting plate is configured to continue from the inner plate and the outer plate, and the mounting plate is perpendicular with the inner plate; wherein, a reinforcement plate is configured to extend downwardly from a side of the mounting plate, and the reinforcement plate corresponds with the inner plate.

11. The heat dissipation device according to claim 10, wherein the cooling fan is displaced below the mounting plate and is attached thereto, and the cooling fan is located between the reinforcement plate and the inner plate.

12. The heat dissipation device according to claim 1, further comprising a upper mounting member with an L-shape, wherein the upper mounting member includes a transverse section and a longitudinal section, the transverse section is mounted on the inner plate, and the longitudinal section is mounted on a frame of the motorcycle.

13. The heat dissipation device according to claim 1, further comprising a lower mounting member, wherein an end of the lower mounting member is mounted on the mounting plate, another end of the lower mounting member is provided with a through hole for a belt member to pass through; wherein one end of the belt member is configured to pass through the through hole and to further bypass pipelines of the motorcycle, in turn, two ends of the belt member are combined with each other; alternatively, one end of the belt member is configured to pass through the through hole and to further bypass pipelines of the motorcycle, in turn, two ends of the belt member are combined with each other.

14. The heat dissipation device according to claim 13, further comprising a clamp ring, wherein the clamp ring at least comprises a ring body and an attachment member, a gap portion is provided between two ends of the ring body, the ring body is sleeved on the pipeline of the motorcycle, the attachment member is configured to pass through the through hole and to be attached to the gap portion so as to seal the ring body, in such a way, the clamp ring is clamped onto the pipeline of the motorcycle.

15. The heat dissipation device according to claim 14, further comprising a clamp ring, wherein the clamp ring at least comprises a ring body and an attachment member, a gap portion is provided between two ends of the ring body, the ring body is sleeved on the pipeline of the motorcycle, the bent portion is placed between the two ends of the ring body, the attachment member is configured to pass through the through hole and to be attached to the corresponding two ends of the ring body so as to shorten the gap portion, in such a way, the clamp ring is clamped onto the pipeline of the motorcycle.

16. The heat dissipation device according to claim 13, wherein the lower mounting member comprises a first extension section and a second extension section, the first extension section extends from an end that is mounted on the mounting plate to an inside of the motorcycle for a proper distance, the second extension section continues to extend from the first extension section in a length direction of the motorcycle to an outside of the outer plate, a bent portion is formed at an outer portion of the second extension section, and the through hole is provided at the bent portion.

17. The heat dissipation device according to claim 1, further comprising a power switch, wherein the power switch is disposed at an upper half of the inner plate.

18. The heat dissipation device according to claim 1, further comprising a plurality of ribs, wherein the ribs are disposed at a junction of the inner plate and the outer plate.

* * * * *